United States Patent [19]

Martin et al.

[11] 4,011,618

[45] Mar. 15, 1977

[54] BARN CLEANER SCRAPER

[75] Inventors: Rodney O. Martin, Manlius; John C. Whitman, Moravia, both of N.Y.

[73] Assignee: Agway, Inc., DeWitt, N.Y.

[22] Filed: Oct. 24, 1975

[21] Appl. No.: 625,639

[52] U.S. Cl. .............................. 15/93 R; 198/737
[51] Int. Cl.² ...................................... B65G 25/08
[58] Field of Search ........... 15/93 R; 198/110, 221, 198/224, 229, DIG. 18

[56] References Cited

UNITED STATES PATENTS

| 538,822 | 5/1895 | Draver | 198/224 |
|---|---|---|---|
| 2,676,696 | 4/1954 | Gerhartz | 198/DIG. 18 |
| 3,306,435 | 2/1967 | Wenger | 198/224 |
| 3,530,832 | 9/1970 | DeSatnick | 198/224 X |
| 3,693,782 | 9/1972 | Thoennes | 198/224 |

*Primary Examiner*—Christopher K. Moore
*Attorney, Agent, or Firm*—Christel & Bean

[57] ABSTRACT

A barn cleaner for scraping manure from an alley between two rows of open stalls for cows, which cleaner includes a scraper element which extends transversely of the alley and is of generally triangular cross-section with the base of the triangle against the surface to be scraped to present rearwardly inclining scraping surfaces in both directions. The triangular scraper element includes weight means within the triangular area to insure intimate scraping contact. In a modification a pair of longitudinally spaced transversely extending scrapers are connected at their opposite ends by guide plates which extend longitudinally of the alley and form a rigid rectangular scraping frame with the guide plates in sliding engagement with curb formations at the juncture of the open stall spaces with the alley therebetween.

5 Claims, 5 Drawing Figures

BARN CLEANER SCRAPER

BACKGROUND OF THE INVENTION

This invention relates to barn cleaners and more particularly to manure scrapers which operate in the alleys or central passageways of free stall cow barns to periodically scrape the manure from such alleys.

Barn cleaners of this general type are well known in the dairy farm art and the present invention is directed to eliminating certain deficiencies in conventional barn cleaners.

The manure scraper elements of conventional barn cleaners are generally upright blade elements which are power driven in opposite directions along the extent of the alley between the free stalls of the cow barn. These more or less vertical blades move against the feet of cows in the alley to substantially discommode the cows and there is a distinct possibility of the cow's lower leg portions being bruised or injured by the scraper blade. There is also the possibility of the cow's hoof being caught beneath the blade and despite the fact that the blade is connected to a traction chain the blade frequently does not engage the surface of the alley in intimate scraping contact.

Another objection to conventional barn cleaners which is avoided in one form of the present invention resides in the fact that conventional barn cleaners include traction chains for the scraper element which chains must travel in a groove or channel formed longitudinally and centrally through the concrete barn alley. In conventional barn cleaners this groove or channel is relied upon to maintain the scraper blade in proper transverse alignment as it passes along the alley.

It is very difficult to form such a groove or channel in the concrete alley in existing cow barn structures so that the installation of conventional barn cleaners in such existing structures is very much complicated and often ruled out on economic grounds.

SUMMARY OF THE INVENTION

In one aspect of the present invention scraper blade means are provided which are triangular in cross section with the base of the triangle adapted to move along the alley surface and the two sides of the triangle presenting sloping faces so that the engagement thereof with the feet of the cows is such that it will not be injurious to the cows and will engage the feet of the cows in such a way as to gently urge the cow to raise his feet over the scraper element as it moves along.

The triangular scraper blade of the present invention is substantially weighted by providing a concrete slab within the triangular cross section so that the blade bears firmly downwardly against the alley surface in its movement therealong.

In a further embodiment of the invention the traction chain which draws the scraper blade back and forth merely slides along the alley surface without the necessity for a guiding groove or channel in the alley surface. This is made possible by providing a scraping apparatus which is in the form of a rectangular frame as viewed in plane and the opposite side edges of this rectangular scraping blade are disposed and proportioned so that they have guiding engagement against the facing curb formations which exist along the opposite edges of the alley because the alley surface is normally at a slightly lower level than the stall surfaces at opposite sides of the alley.

DESCRIPTION OF THE ILLUSTRATED EMBODIMENTS

Figure 1:
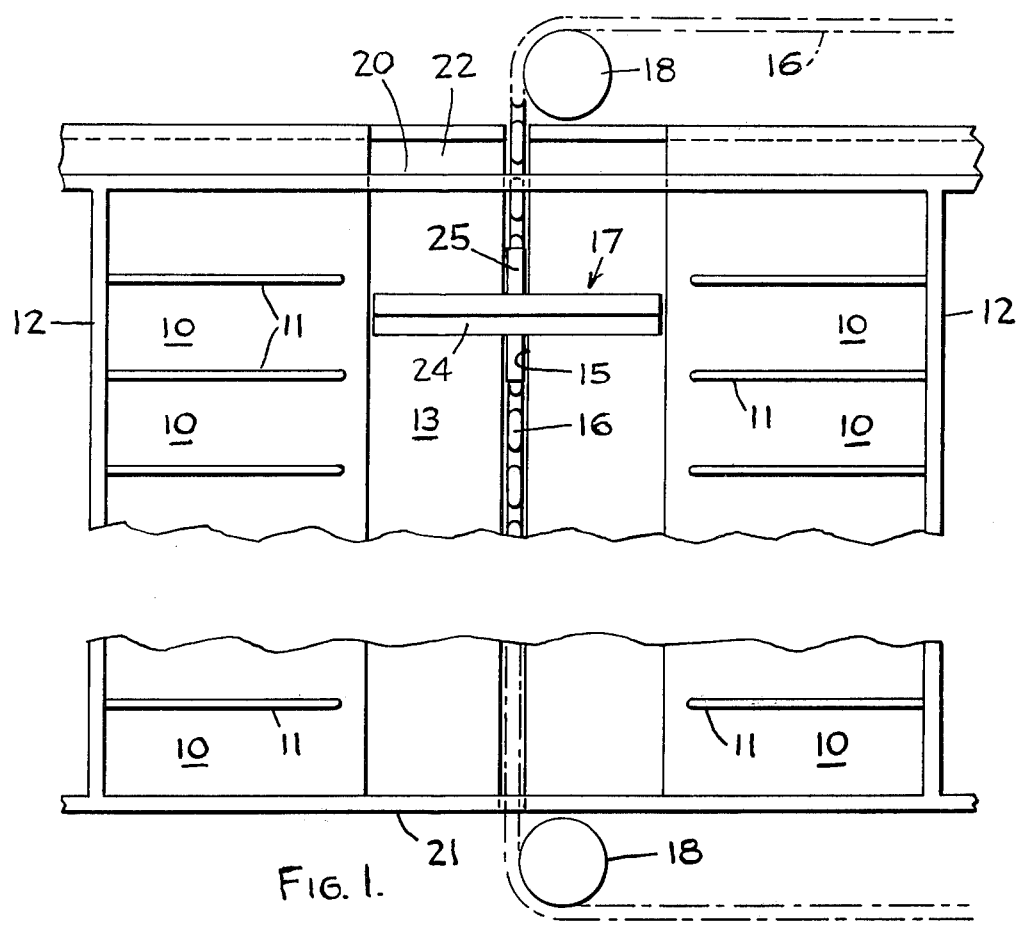
FIG. 1 is a fragmentary top plan view of an open stall cow barn equipped with one form of the manure scraper of the present invention.

In FIG. 1 the numeral 10 designates two rows of open stall spaces having conventional dividers 11 and head walls 12. The numeral 13 designates a central passageway or alley between the two rows of stalls. This general arrangement is conventional in so-called open stall cow barns. Midway along the rows of stalls one or both of the head walls 12 are interrupted to provide entrance and exit passageways for the cows. This portion of the stall arrangement is broken away and does not appear in FIG. 1.

As shown in FIG. 1 the passageway 13 is provided with a central longitudinal channel 15 which receives an endless chain 16 to which a scraper member designated generally by the numeral 17 is attached. Chain 16 passes about idler sprockets 18. The chain 16 passes about other sprockets disposed outwardly to the right of the structure shown in FIG. 1 to pursue a rectangular path and sprocket means and a motor for driving the chain alternately in opposite directions are also provided. This chain and sprocket drive arrangement for cow barn scrapers is conventional and well known and need not be further illustrated or described herein.

In the illustrated instance the passageway 13 is closed at its ends by walls 20 and 21 and the wall 20 has an opening at its lower portion extending the width of passageway 13 so that scraper 17 may pass therethrough and deposit manure scraped thereby into a gutter 22. The material thus deposited is moved lengthwise of the gutter and removed therefrom by conventional means well known in the dairy farm field and not directly involved in the present invention.

Figure 2:
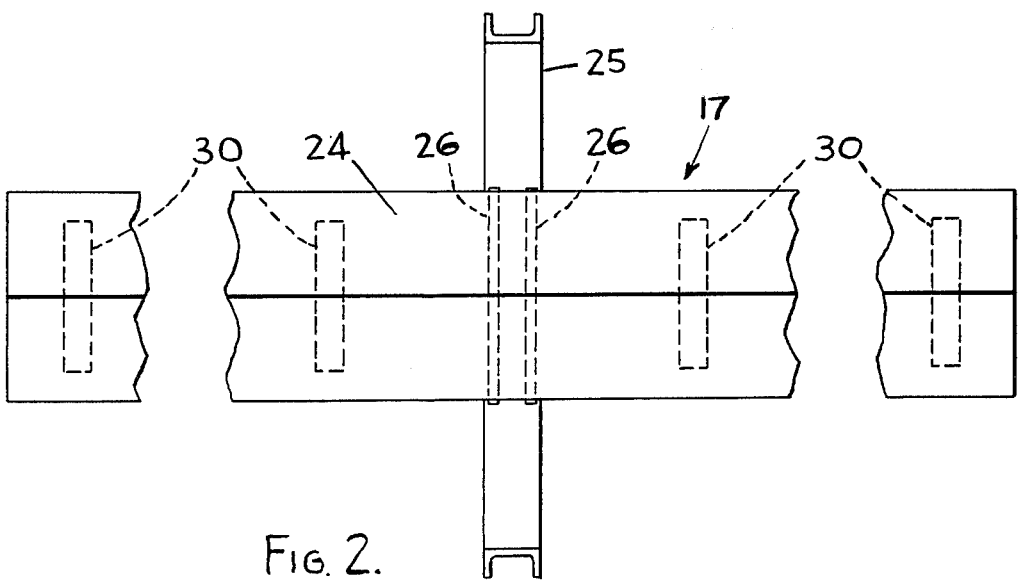
FIG. 2 is a top plan view of the scraper element of FIG. 1 on a larger scale.
Figure 3:
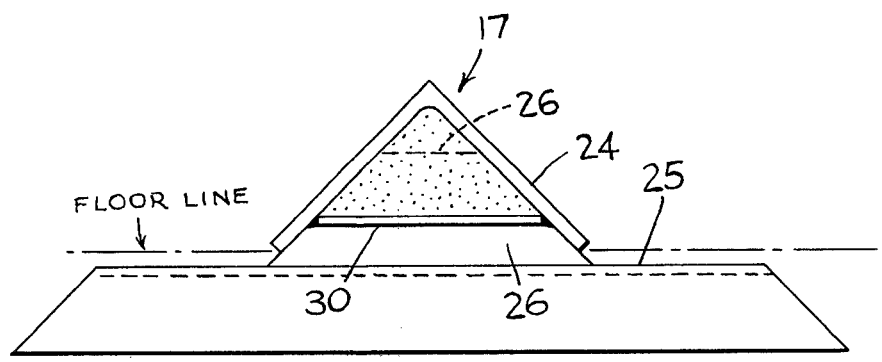
FIG. 3 is an end elevational view of the scraper of FIG. 2.

In the embodiment of FIGS. 1 to 3 the novel element is the scraper 17 which, as shown in FIGS. 2 and 3, comprises a member 24, including a pair of flange or plate elements connected at their upper sides, which extends at right angles to chain 16 and presents two scraping surfaces each inclined upwardly and rearwardly with respect to a respective one of the directions of movement of the scraping means, and are disposed at an angle of about 45° to the surface of passageway 13. An inverted channel member 25 is fixed to the lower edges of scraper 24 at right angles thereto by means of a pair of trapezoidal gusset plates 26 which are welded within the scraper 24 and to the upper surface of channel member 25. Channel member 25 fits over and is secured to chain 16.

The scraper element of the present invention is weighted to insure effective scraping engagement with the passageway surface and to this end, as shown in FIGS. 2 and 3, the member 24 is provided with a plurality of longitudinally spaced transverse strap members 30 which are welded at their ends to the interior surfaces of scraper member 24. After the straps are fixed to member 24 the latter is inverted and concrete is poured thereinto up to the level of the straps so that, upon drying of the concrete, the straps retain the triangular concrete slab in place. The slab is designated 31 in FIG. 3. It will be noted that the ends of channel 25 are beveled as shown in FIG. 3 so that the ends of the channel members tend to lift debris from the channel 15 in passageway 13 as the scraper moves along the passageway.

The power means referred to above for operating chain 16 to move scraper 17 back and forth moves the scraper up to wall 21 then reverse to move the scraper through the passageway 13 and under wall 20 to discharge material collected ahead of scraper 17. Conventional cow barnscrapers present upright faces which move against the feet and legs of cow standing in or partly in the alley or central passageway. The sloping faces at opposite sides of the scraper of the present invention move against the bottom edges of the cow's feet whereupon they raise their feet and step over the scraper.

In cases where the scraper 17 moves against a solid wall, as for instance wall 21 of FIG. 1, the manure which collects at the leading face of the scraper tends to be squeezed upward and over the top of the scraper to be pushed forward when the scraper begins its movement toward gutter 22. Of course a certain amount of the material will remain against the base of wall 21 upon such reversal of the scraper.

Figure 4:
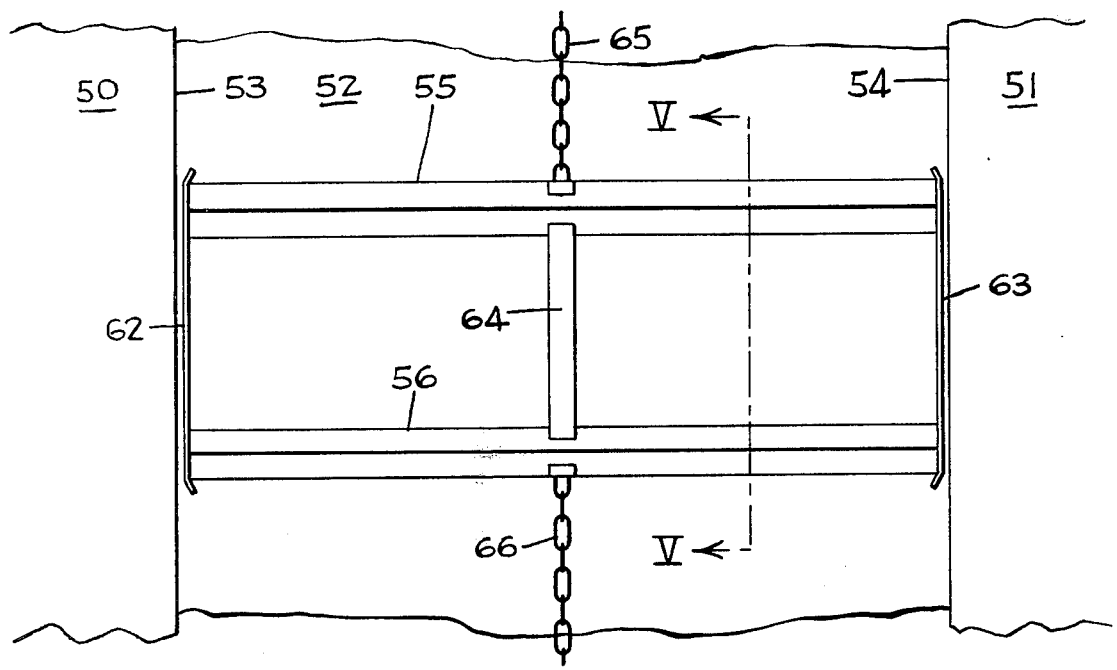
FIG. 4 is a top plan view of a modified scraper arrangement.
Figure 5:
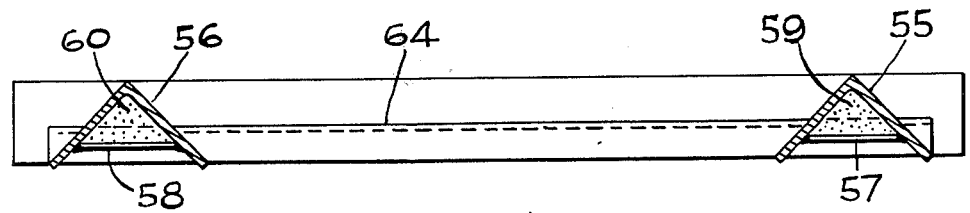
FIG. 5 is a cross sectional view on the line V—V of FIG. 4.

Reference will now be had to the embodiment illustrated in FIGS. 4 and 5. Conventional manure scrapers, as is illustrated in FIG. 1 of the first embodiment, involve the provision of a longitudinal groove or channel along the alley central passageway. This groove or channel houses the scraper chain mechanism including the longitudinal channel member which is fixed to the scraper element and the guidance of the groove or channel maintains the scraper element in proper transverse alignment. This type of construction presents a problem where a scraper mechanism is to be installed in an existing cow barn wherein the longitudinal groove or channel is not present.

The embodiment of FIGS. 4 and 5 avoids the necessity of this guiding groove or channel and thus facilitates installing the apparatus in instances where the guiding groove or channel is not available. It is of course also applicable in new construction in which case it is not necessary to provide the longitudinal groove or channel.

Referring to FIG. 4, the floor portions of the open stall spaces at opposite sides are designated 50 and 51 and the alley or central passageway therebetween is designated 52. The central passageway or alley is depressed in elevation with respect to the stall spaces 50 and 51 as is conventional in open stall cow barns. Accordingly the stall spaces 50 and 51 present curbing formations 53 and 54 respectively which border the central longitudinal passageway 52. In the present embodiment these curbing formations provide guiding surfaces for the scraper mechanism, thus doing away with the necessity for other scraper guiding means.

In FIGS. 4 and 5 the scraper mechanism is shown as comprising a pair of longitudinally spaced transversely extending scraper elements 55 and 56. Each of the scraper elements is preferably formed in the same manner as the scraper element 17 of the embodiment of FIGS. 1 through 3. Thus, as shown in FIG. 5, each of the scraper elements 55 and 56 comprises an inverted V-shaped angle member having internal transverse straps designated 57 and 58, respectively, and poured concrete fillers designated 59 and 60, respectively.

The longitudinally spaced scraper elements 55 and 56 are connected at their side edges by generally vertically disposed guide plates 62 and 63 which extend longitudinally and thus form, with the scraper elements per se, a rectangular scraping frame. An additional brace member 64 extends between the scraper elements 55 and 56 as shown in FIG. 4.

With this rectangular scraper construction the scraper is effectively guided for longitudinal movement with the scaping elements 55 and 56 extending transversely of the passageway and without the necessity for a guiding groove or channel along the passageway. It is merely necessary to attach the endless driving chain to the front and rear portions of the scraping frame midway thereof as clearly shown at 65 and 66 in FIG. 4. In the form shown in FIGS. 4 and 5 the central brace 64 extends through the scraper members 55 and 56 which are notched at their lower portions to receive the same and is of inverted U-shape so that the chains 65, 66 may extend therethrough and be fastened therein. The scraper members 55 and 56, the side plates 62 and 63, and the central brace 64 are welded into an integrally rigid rectangular frame. It will be noted that the opposite ends of the side guide plates 62 and 63 are curved at their ends to insure smooth sliding movement of the plates 62 and 63 along the curb formations 52 and 53.

Apart from the fact that the traction chain of the present embodiment moves along the surface of the passageway instead of in a groove or channel, the drive mechanism for moving the scraper apparatus back and forth along the passageway may be the same in the present embodiment as in the embodiment of FIGS. 1 through 3 which, as stated above, is conventional and well known in the present art. Here again, the scraper element may move toward and up to a solid wall at one end of the central passageway and to a gutter or channel at the other end thereof.

As to both embodiments, there may be gutters or channels provided at both ends of the central passageway instead of the solid wall at one end of the passageway. In such case the scraper element will of course discharge debris at both ends of its path of movement.

Preferred embodiments of the present invention have been described herein and shown in the accompanying drawings to illustrate the underlying principles of the invention but it is to be understood that numerous modifications may be made without departing from the broad spirit and scope of the invention.

We claim:

1. A barn cleaner for scraping manure from an elongated rectangular area comprising scraping means extending transversely of said area and power means for moving said scraping means to and fro lengthwise of said area, a drive chain extending in opposite directions from said scraping means for connection with said power means, said scraping means comprising a scraping element extending across a major portion of said rectangular area and comprising a pair of flange elements connected along their upper edges and extending obliquely downwardly to present an open side toward the surface to be scraped and provide a pair of scraping surfaces each inclined upwardly and rearwardly with respect to a respective one of the directions of movement of the scraping means.

2. A barn cleaner according to claim 1 wherein said scraping element is weighted by a concrete body cast thereinto with the scraper element in inverted position, and means for retaining said concrete body in said scraping element.

3. A barn cleaner according to claim 2 wherein said concrete body retaining means comprises members extending between and secured to the legs of said angular scraping element at the interior thereof.

4. A barn cleaner for scraping manure from an elongated area lying between a pair of generally parallel longitudinal curb formations comprising scraping means comprising a pair of transversely extending longitudinally spaced scraping elements, longitudinally extending guide members rigidly connecting the ends of said scraping elements to form a rectangular scraping frame, said guide members being adapted to engage said curb formations in sliding contact to guide said scraping frame along said elongated area, and power means for driving said scraping frame along said area in opposite directions, each of said scraping elements comprising a pair of plate elements connected along their upper edges and extending obliquely downwardly to present an open side toward the surface to be scraped and provide a pair of scraping surfaces each inclined upwardly and rearwardly with respect to a respective one of the directions of movement of the scraping means.

5. A barn cleaner according to claim 4 wherein said scraping elements are weighted by concrete bodies cast thereinto, and means for retaining said concrete bodies in said scraping elements.

* * * * *